(12) United States Patent
Som et al.

(10) Patent No.: US 12,259,834 B2
(45) Date of Patent: Mar. 25, 2025

(54) DYNAMIC VARIATION OF BUS PARAMETERS

(71) Applicant: HEWLETT PACKARD ENTERPRISE DEVELOPMENT LP, Spring, TX (US)

(72) Inventors: Sukhamoy Som, Houston, TX (US); Robert L. Noonan, Crystal Lake, IL (US); Theodore F. Emerson, Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 96 days.

(21) Appl. No.: 18/151,559

(22) Filed: Jan. 9, 2023

(65) Prior Publication Data

US 2024/0232110 A1  Jul. 11, 2024

(51) Int. Cl.
G06F 13/36 (2006.01)
G06F 13/16 (2006.01)
G06F 13/42 (2006.01)

(52) U.S. Cl.
CPC .......... G06F 13/36 (2013.01); G06F 13/1678 (2013.01); G06F 13/4256 (2013.01)

(58) Field of Classification Search
CPC .................................. G05B 19/4183
See application file for complete search history.

(56) References Cited

U.S. PATENT DOCUMENTS

| | | | |
|---|---|---|---|
| 8,547,135 B1 | 10/2013 | Yarlagadda et al. | |
| 9,208,047 B2 | 12/2015 | Mcgraw | |
| 9,281,938 B2 | 3/2016 | Omata et al. | |
| 9,423,855 B2 | 8/2016 | Fang | |
| 10,289,423 B2 | 5/2019 | Nguyen et al. | |
| 10,345,377 B2 | 7/2019 | Kutz et al. | |
| 10,866,747 B2 | 12/2020 | Som et al. | |
| 10,916,280 B2 | 2/2021 | Montero et al. | |
| 2016/0180095 A1 | 6/2016 | Sarangdhar | |
| 2017/0244566 A1* | 8/2017 | Tschache | H04L 9/14 |
| 2021/0365566 A1* | 11/2021 | Souissi | H04L 9/0861 |
| 2021/0382832 A1 | 12/2021 | Heinrich et al. | |

FOREIGN PATENT DOCUMENTS

WO  2017/131671 A1  8/2017

OTHER PUBLICATIONS

Buhren, R., et al., "One Glitch to Rule Them All: Fault Injection Attacks Against AMD's Secure Encrypted Virtualization", arXiv:2108, Aug. 26, 2021 pp. 15.

Delorenzo, A., "Hardware Hacking 101: Interfacing With SPI", Feb. 2020, pp. 15.

(Continued)

*Primary Examiner* — Henry Tsai
*Assistant Examiner* — Juanito C Borromeo
(74) *Attorney, Agent, or Firm* — Trop, Pruner & Hu, P.C.

(57) ABSTRACT

In some examples, a management controller is to dynamically vary a parameter that controls an operational characteristic of a bus when transferring different portions of information from a memory over the bus during a process of an electronic device in which a cryptographic operation is performed. The different portions of the information from the memory are to be transferred over the bus with different operational characteristics of the bus.

19 Claims, 5 Drawing Sheets

(56) References Cited

OTHER PUBLICATIONS

Kesler, A., "Obscure & Undetected: Hacking Into Hardware of Mission-CriticalInfrastructure Using Side-Channel Attacks", Nov. 14, 2019, retrieved from: https://www.securitymagazine.com/articles/91269-obscure-undetected-hacking-into-hardware-of-mission-critical-infrastructure-using-side-channel-attacks, pp. 3.
Raucher, A. "Protecting Against Side-Channel Attacks with an Ultra-Low Power Processor", Synopsys, Nov. 1, 2022 pp. 9.
Tehranipoor M., et al., "Hardware Root-of-Trust for Cyber Security", All Rights Reserved—University of Florida, Nov. 1, 2022, pp. 44.

* cited by examiner

DYNAMIC VARIATION OF BUS PARAMETERS

BACKGROUND

Memory devices can be used to store program code (including machine-readable instructions such as firmware and/or software) and data. Examples of program code include boot code that is executed during startup of an electronic device. The boot code can be stored in a nonvolatile memory device, such as a flash read-only memory (ROM) device.

BRIEF DESCRIPTION OF THE DRAWINGS

Some implementations of the present disclosure are described with respect to the following figures.

Figure 1:
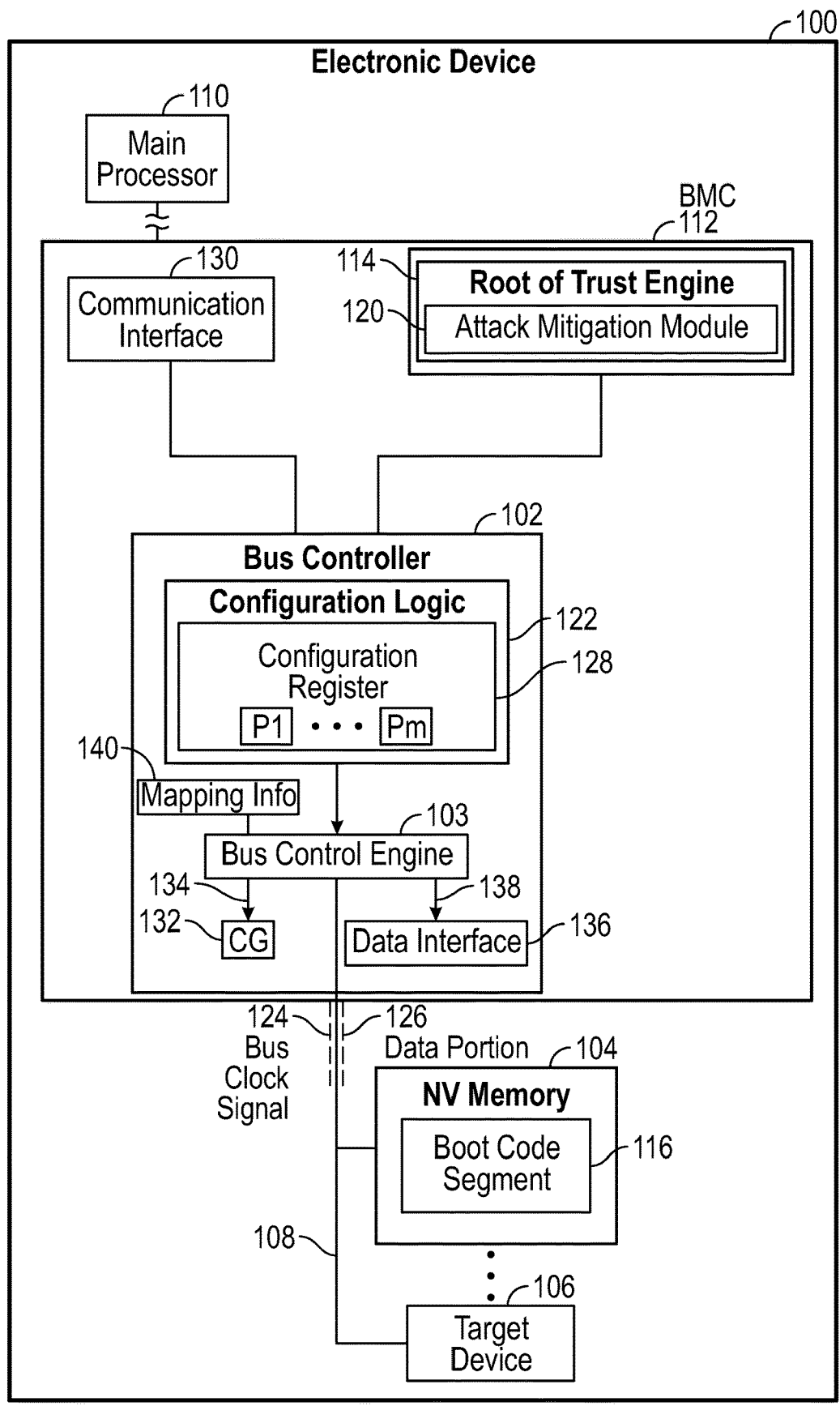
FIG. 1 is a block diagram of an arrangement including a management controller, a bus controller, and target devices connected over a bus to the bus controller, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A flash read-only memory (ROM) device is a nonvolatile, electrically erasable and reprogrammable memory device. An example type of a flash ROM is a NOR flash ROM. Another example type of a flash ROM is a NAND flash ROM. In an electronic device, certain information (including program code and data) may be stored in the flash ROM device or another type of nonvolatile memory device. For example, a boot code, device configuration data, and other sensitive data may be stored in the flash ROM device. A basic input/output system (BIOS) code is an example of a boot code that is executed when the electronic device starts up to initialize components of the electronic device and to load an operating system (OS) of the electronic device.

Attackers may seek to gain access to an electronic device by observing operations relating to a program code (e.g., a segment of the BIOS code) stored in a flash ROM device. An example type of attack is a side-channel attack, in which an attacker monitors certain components of an electronic device (e.g., bus signals communicated over a bus, electrical behavior of power components such as a power supply or power regulator, etc.), and/or electromagnetic emissions of components to observe characteristics of the electronic device, including any or some combination of the following: timings of operations in the electronic device, power consumption in the electronic device, and electromagnetic radiation levels from the electronic device. Examples of techniques that can be used to monitor the foregoing observed characteristics can include monitoring a bus connected to the flash ROM device using a probing device (e.g., a signal tracer), probing power connections of power components using a device that can capture electrical signals (e.g., an oscilloscope), measuring electromagnetic emissions using an electromagnetic measurement device (e.g., an electromagnetic field meter), and so forth.

The foregoing observed characteristics may be used by the attacker to derive sensitive information used in the electronic device, such as information relating to cryptographic operations of a security system of the electronic device (e.g., cryptographic operations of the segment of the code stored in the flash ROM device). Variations in power consumption and/or electromagnetic emissions along with the timings of such variations can be captured and used to reveal the nature of computations performed by the electronic device. Examples of sensitive information that can be derived from observed characteristics can include a cryptographic key and/or a secret used in the cryptographic operations.

Attackers can use various techniques (e.g., by varying parameters such as voltages, currents, etc.) in attempts to cause a malfunction in an electronic device. By monitoring the foregoing observed characteristics, an attacker can leverage repeatability in operations of the electronic device (such as a security system of the electronic device) to predict a deterministic behavior of the electronic device. The attacker can then guess when to vary a specific collection of parameters (one parameter or multiple parameters) to induce a malfunction at a target time (e.g., an elapsed time measured from a fixed start point such as a time of reset of the electronic device). For example, the attacker can iterate, over a large quantity of times (e.g., thousands to millions of times), an injection of a voltage spike (and/or one or more other parameters) in the electronic device at one or more target times, such as during a boot sequence of the electronic device, to induce a malfunction(s), which can allow the attacker to derive sensitive information.

The attacker can use the derived cryptographic key and/or secret to steal information in the electronic device or another device to which the electronic device is coupled (such as over a network). The attacker may also use the cryptographic key and/or a secret to control operations of the electronic device or another device to which the electronic device is coupled.

In accordance with some implementations of the present disclosure, an attack mitigation engine is able to dynamically change fetch parameters that control communication attributes of a bus between a nonvolatile memory device that stores a target program code and a bus controller for the bus. By varying the communication attributes of the bus, portions of the target program code can be retrieved from the nonvolatile memory device in an unpredictable manner (e.g., at different rates, in segments of different sizes, etc.), which affects the timing of delivering the portions of the target program code for execution on a processor. The attack mitigation engine is able to prevent or reduce the likelihood of success of side-channel attacks, or any other attacks of an electronic device that is based on repeatability of electronic device operations determined from observing a behavior of an electronic device during a particular operation of the electronic device, such as during a boot process, during a process in which cryptographic operations are performed, and so forth. By varying the communication attributes of the bus as noted above, each occurrence of an operation such as the boot process of an electronic device can be made to be unique so that an attacker would not be able to determine when to time an attack.

FIG. 1 is a block diagram of an example electronic device 100 that includes a bus controller 102 coupled to various target devices over a bus 108. As used here, a "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, a "controller" can refer to a combination of one or more hardware processing circuits and machine-readable instructions (software and/or firmware) executable on the one or more hardware processing circuits. In more specific examples, the bus controller 102 can be implemented using a hardware state machine that does not rely on machine-readable instructions to operate. In some examples, the bus controller 102 can be part of a management controller, such as a baseboard management controller (BMC) 112. Details regarding a "BMC" are provided further below. In other examples, the bus controller 102 can be outside the BMC 112.

Examples of electronic devices include any of the following: a computer (e.g., a server computer, a desktop computer, a notebook computer, a tablet computer, etc.), a smartphone, a wearable device, a game appliance, a vehicle or an electronic component of a vehicle, a storage system, a communication system, a household appliance, and so forth.

The target devices connected to the bus 108 include a nonvolatile memory device 104 and another target device 106. A "bus" can refer to any communication link that includes a collection of signal lines (a single signal line or multiple signal lines) over which data can be transferred. In some examples, the nonvolatile memory device 104 is a flash ROM device. In other examples, the nonvolatile memory device 104 can be implemented using a different type of memory device.

A "nonvolatile" memory device is able to persistently store data even if power were removed from the memory device. In some examples, the target device 106 can be another nonvolatile memory device or another type of device.

Although FIG. 1 shows multiple target devices connected to the bus 108, in other examples, a single target device (e.g., the nonvolatile memory device 106) or more than two target devices can be connected to the bus 108.

The bus controller 102 includes a bus control engine 103 that controls communications over the bus 108 with the target devices 104 and 106. The bus control engine 103 can be implemented using a portion of the hardware processing circuit or machine-readable instructions of the bus controller 102.

In some examples, the bus 108 can be a Serial Peripheral Interface (SPI) bus. In other examples, the bus 108 can be a different type of bus, such as an Inter-Integrated Circuit (I2C) bus, or another type of bus.

The SPI is a synchronous serial communication interface used for short-distance communications. In examples where the bus 108 is an SPI bus, the controller 102 is an SPI controller. On an SPI bus, a primary device (e.g., the SPI controller) controls operations on the SPI bus, including providing a clock signal and one or more select signals to select respective one or more target devices (or peripheral devices) that the primary device is to communicate with. In addition, the SPI bus includes an input/output (I/O) data portion over which the primary device can send data bits to and receive data bits from a target device. In some examples, the SPI bus can be a configurable quad SPI bus that is configurable in any one of an x1 mode, an x2 mode, or an x4 mode. In the x1 mode, the I/O data portion of the SPI bus transfers data bits over one data signal line in each direction (one unidirectional data signal line to transfer data bits from the primary device to the target device, and another unidirectional data signal line to transfer data bits from the target device to the primary device). In the x2 mode, the I/O data portion transfers data bits over two bidirectional data signal lines between the primary device and the target device. The primary device can drive the two data signal lines to output commands and addresses. When the primary device expects a response from the target device, the primary device can tristate its output drivers to the bus, so that the target device can send data to the primary device over the two data signal lines. Commands, addresses, and data on an SPI bus can be sent in respective command, address, and data phases (described further below). In the x4 mode, the I/O data portion transfers data bits over four bidirectional data signal lines between the primary device and the target device (similar to the x2 mode but with a larger quantity of data signal lines).

Although reference is made to an SPI bus in some examples, in other examples, other types of buses can be used to transfer data to or from a nonvolatile memory device and other target devices.

In further examples, the electronic device 100 can include multiple bus controllers to communicate over respective buses (e.g., SPI buses) with other target devices.

The electronic device 100 also includes a main processor 110 (or multiple main processors), which can be coupled to the BMC 112 to allow the main processor 110 to communicate with target devices connected to the bus 108. The main processor 110 is separate from the BMC 112. In an example, the main processor 110 can retrieve a boot code segment 116 stored in the nonvolatile memory device 104, for execution by the main processor 110 during a boot process of the electronic device 100.

A "main processor" can refer to a processor that is to execute programs such as an OS, an application program, system firmware, and so forth, of the electronic device 100. The main processor 110 can be coupled through intervening components to the BMC 112, such as through a network interface controller, an I/O hub, and so forth. The BMC 112 includes a communication interface 130, such as a Peripheral Component Interconnect (PCI) Express (PCIe) interface, an Enhanced Serial Peripheral Interface (eSPI), a Low Pin-Count (LPC) interface, or a network interface controller or another type of interface that allows the BMC 112 to communicate with another component outside the BMC 112.

In some examples of the present disclosure, the BMC 112 includes a root of trust engine 114. In some examples, the root of trust engine 114 in the BMC 112 is implemented in hardware, such as in the form of hardware state machines. In other examples, the root of trust engine 114 can be implemented using machine-readable instructions, such as firmware or software executed by the BMC 112 (and not by the main processor(s) 110 of the electronic device 100).

The root of trust engine 114 can perform validation of certain components and processes of the electronic device 100, to ensure that the components and processes can be trusted and have not been compromised. For example, the root of trust engine 114 can validate a boot process of the electronic device 100 to ensure that the electronic device 100 is started using trusted boot code (or more specifically, using a trusted boot code segment 116 in the nonvolatile memory device 104. A "boot process" refers to a process that is run when an electronic device initially starts, with the boot process performing testing and initialization of components of the electronic device, and loading of an OS of the electronic device. The validation of the boot process performed by the root of trust engine 114 can include validating the boot code segment 116 stored in the nonvolatile memory device 104.

The boot code segment 116 can include a segment of a boot code (e.g., boot code of the BMC 112, BIOS code (e.g., the boot block of the BIOS code), etc.) that performs specified initial functions at the start of the boot process of the electronic device 100. In some examples, the boot code of the BMC 112 is verified by the root of trust engine 114 and then allowed to execute after the root of trust engine 114 determines that a digital signature of the boot code of the BMC 112 matches an expected value. The boot code of the BMC 112 then verifies a next portion of the boot code before allowing the next portion to execute, and so forth.

The root of trust engine 114 performs validation of the boot code segment 116 by computing cryptographic values, such as cryptographic hash values, from on the boot code segment. The cryptographic values are computed using cryptographic operations that employ a cryptographic key and/or another secret.

In accordance with some implementations of the present disclosure, the root of trust engine 114 includes an attack mitigation module 120 that is able to perform actions to prevent an attacker from successfully performing a side-channel attack and/or an entity-in-the-middle attack. The attack mitigation module 120 can be implemented using a portion of the hardware or machine-readable instructions of the root of trust engine 114.

Although FIG. 1 shows the attack mitigation module 120 as being part of the root of trust engine 114, in other examples, the attack mitigation module 120 can be in the bus controller 102 and separate from the root of trust engine 114. In further examples, the attack mitigation module 120 can be implemented using another component of the electronic device 100.

The bus controller 102 includes programmable configuration logic 122 that can be configured by the attack mitigation module 120 to dynamically change one or more bus attribute parameters that would vary one or more respective operational characteristics of the bus 108.

In some examples, bus attribute parameters that can be dynamically varied by configuring the programmable configuration logic 122 include any or some combination of the following: a bus clock parameter that relates to a clock frequency of a clock signal 124 of the bus 108, and a data width parameter relating to a width of a data portion 126 of the bus 108.

The clock parameter can be set to one of various different values that correspond to different frequencies of the bus clock signal 124. The bus width parameter can be set to one of various different values that correspond to different widths of the data portion 126 of the bus 108. For example, if the bus 108 is a configurable quad SPI bus, then the bus width parameter can be set to one of several different values to select a x1 mode, a x2 mode, or a x4 mode. More generally, the different values of the bus width parameter can specify respective different quantities of data signal lines of the bus 108 and/or respective different behaviors of the data signal lines of the bus 108 (e.g., the x1 mode uses two unidirectional data signal lines while the x2 mode uses two bidirectional data signal lines) to use for carrying data between the bus controller 102 and a target device (e.g., the nonvolatile memory device 104). In examples where different phases of a bus transaction are used to carry a command, an address, and data over the bus 108 (e.g., an SPI bus), different modes can be set for the different phases (discussed further below). Also, in some cases (such as with an SPI bus), different commands can specify respective data widths to use for an address and data; in such examples, different values of the bus width parameter can control which command is issued; in other words, different commands may be tied to respective data widths. For example, a first command can perform an x1 SPI read (to read data in the x1 mode), a second command can perform an x2 SPI read (to read data in the x2 mode), and a third command can perform an x4 SPI read (to read data in the x4 mode). The bus controller 102 may alter the command being sent to be consistent with the data width desired.

In some examples, the programmable configuration logic 122 includes a configuration register 128 (or multiple configuration registers). A "register" refers to a storage component that is able to store a data value. The configuration register 128 can store values of multiple bus attribute parameters P1 to Pm (m≥1). As examples, the bus attribute parameters P1 to Pm include the clock parameter and the bus width parameter noted above. In further examples, different bus attribute parameters P1 to Pm can be stored in respective different configuration registers 128.

In some examples, the attack mitigation module 120 can write the bus attribute parameters to the configuration register 128 (or to multiple configuration registers). Although FIG. 1 shows a direct connection between the root of trust engine 114 and the bus controller 102, in further examples, there may be one or more intervening components between the root of trust engine 114 and the bus controller 102.

In the ensuing discussion, it is assumed that there is just one configuration register 128 that is programmed with parameter values P1 to Pm to change operational characteristics of the bus 108. Techniques or mechanisms according to further examples can employ multiple configuration registers in the configuration logic 122 of the bus controller 102 to store respective bus attribute parameters.

To program the configuration register 128, the attack mitigation module 120 can send control information to the bus controller 102. The control information can include a configuration write command, for example, which includes an indication that the command is to write the configuration register 128, and a value (e.g., a value of a bus attribute parameter) to write the configuration register 128.

The bus control engine 103 of the bus controller 102 can control the frequency of the bus clock signal 124 based on the clock parameter programmed into the configuration register 128. For example, the bus control engine 103 can provide a control indication 134 (e.g., one or more control signals) to a clock generator 132 of the bus controller 102. The clock generator 132 can include a controllable oscillator that outputs the bus clock signal 124. The control indication 134 to the clock generator 132 can be varied based on different values of the clock parameter to adjust the frequency of the bus clock signal 124 output by the clock generator 132. Alternatively, the bus clock signal 124 may be generated by a programmable divisor inside the clock generator 132 that takes a common input reference signal and divides the input clock by the value programmed in configuration register 128.

The bus control engine 103 of the bus controller 102 can control the bus width of the data portion 126 of the based on the bus width parameter programmed into the configuration register 128. For example, the bus control engine 103 can provide a control indication 138 (e.g., one or more control signals) to a data interface 136 of the bus controller 102. The data interface 136 can include interface circuitry (e.g., I/O buffers, etc.) that are controllable to activate corresponding data signal lines of the bus 108. For example, a data signal line can be activated by enabling an I/O buffer of the data interface 136 for the data signal line. The data signal line can be deactivated by disabling an I/O buffer of the data interface 136 for the data signal line. The control indication 138 to the data interface 136 can be varied based on different values of the bus width parameter to adjust the bus width of the bus 108. In further examples, the bus control engine 103 can send different commands based on different values of the bus width parameter in the configuration register 128. For example, the bus control engine 103 can send a first command that specifies a first bus width in response to a first value of the bus width parameter, the bus control engine 103 can send a second command that specifies a second bus width in response to a second value of the bus width parameter, and so forth. Generally, the bus control engine 103 would modify the command based on a width setting and the target operation. A target device (e.g., 104 or 106) can interpret an incoming command from the bus controller 102 and adjust the data width accordingly.

In alternative examples, the configuration register 128 or another configuration register can be programmed by the attack mitigation module 120 with a command parameter to indicate a command to issue that is consistent with the value of the bus width parameter in the configuration register 128. Different values of the command parameter would indicate respective different commands to use. Thus, the attack mitigation module 120 can control both the bus width and the command to use consistent with the bus width by programming a value of the bus width parameter in the configuration register 128 and a value of the command parameter in the configuration register 128 or another configuration register.

In some examples, mapping information 140 (e.g., in the form of lookup tables) can be stored in a memory at the bus controller 102 to map bus attribute parameter values to respective different operational characteristics (e.g., bus clock frequencies and/or bus data portion widths).

Figure 2:
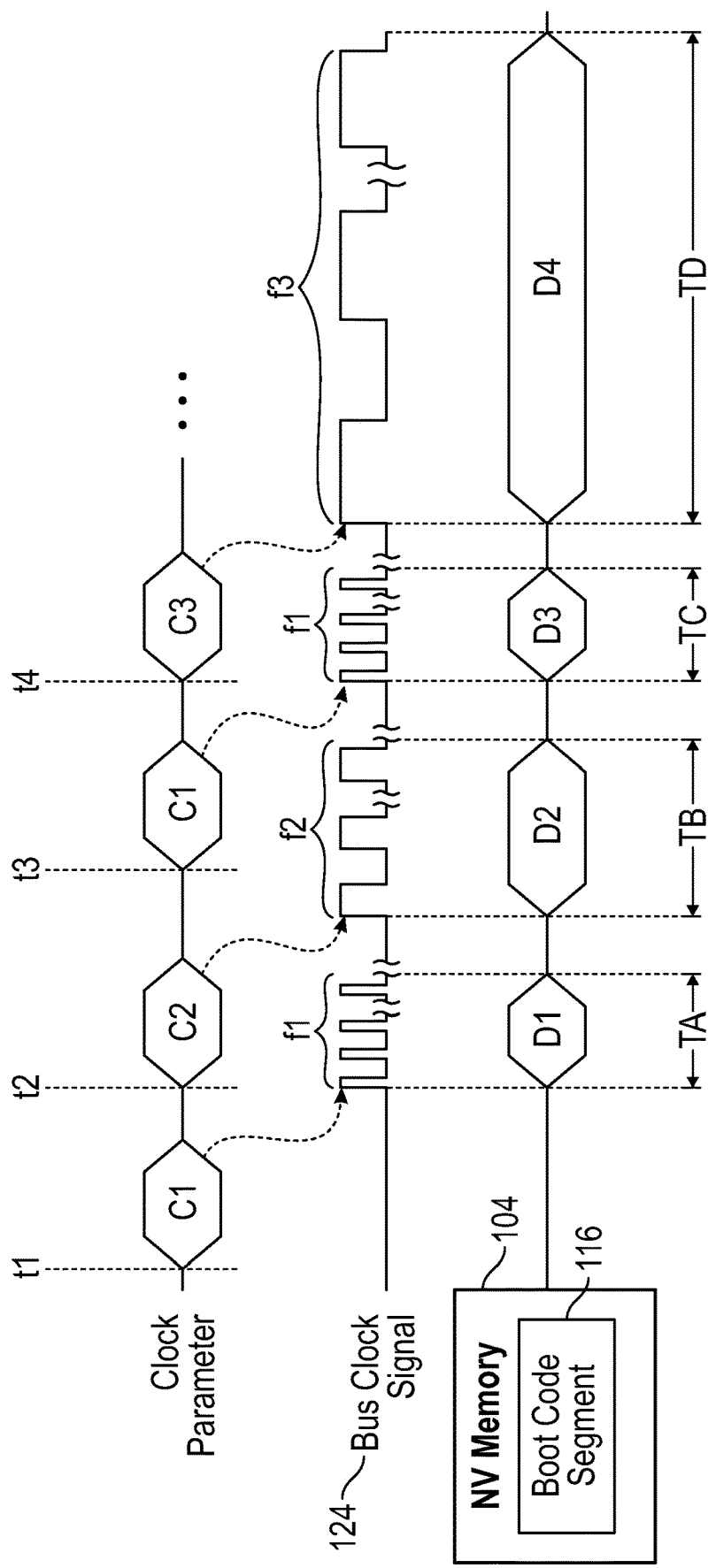
FIG. 2 is a timing diagram of a process of dynamically varying bus clock frequencies according to some examples.

FIG. 2 shows an example timing diagram that illustrates how the frequency of the bus clock signal 124 can be dynamically varied at different times to read respective different portions (represented as portions D1, D2, D3, and D4 in FIG. 2) of the boot code segment 116 from the nonvolatile memory device 104, such as during a boot process of an electronic device.

As part of reading the boot code segment 116 from the nonvolatile memory device 104, the attack mitigation module 120 can write successively different clock parameter values to the configuration register 128. For example, at time t1, the attack mitigation module 120 can write a clock parameter value C1 to the configuration register 128; at time t2, the attack mitigation module 120 can write a clock parameter value C2 (different from C1) to the configuration register 128; at time t3, the attack mitigation module 120 can write the clock parameter value C1 to the configuration register 128; and at time t4, the attack mitigation module 120 can write a clock parameter value C3 (different from each of C1 and C2) to the configuration register 128.

The different values of the clock parameter (C1, C2, and C3) can correspond to different clock frequencies of the bus clock signal 124. As shown in FIG. 2, writing the value C1 of the clock parameter at time t1 to the configuration register 128 causes the bus controller 102 to set a first clock frequency f1 for the bus clock signal 124 during a time interval TA; writing the value C2 of the clock parameter at time t2 to the configuration register 128 causes the bus controller 102 to set a second clock frequency f2 (different from f1) for the bus clock signal 124 during a time interval TB; writing the value C1 of the clock parameter at time t3 to the configuration register 128 causes the bus controller 102 to set a first clock frequency f1 for the bus clock signal 124 during a time interval TC, and writing the value C1 of the clock parameter at time t1 to the configuration register 128 causes the bus controller 102 to set a third clock frequency f3 for the bus clock signal 124 during a time interval TD.

During the time interval TA that the bus clock signal 124 is running at the first clock frequency f1, the bus controller 102 reads the portion D1 of the boot code segment 116 from the nonvolatile memory device 104; during the time interval TB that the bus clock signal 124 is running at the second clock frequency f2, the bus controller 102 reads the portion D2 of the boot code segment 116 from the nonvolatile memory device 104; during the time interval TC that the bus clock signal 124 is running at the first clock frequency f1, the bus controller 102 reads the portion D3 of the boot code segment 116 from the nonvolatile memory device 104; and during the time interval TD that the bus clock signal 124 is running at the third clock frequency f3, the bus controller 102 reads the portion D4 of the boot code segment 116 from the nonvolatile memory device 104.

In the example of FIG. 2, the clock frequency f1 is greater than the clock frequency f2, and the clock frequency f2 is greater than the clock frequency f3. A respective portion of the boot code segment 116 is read at a higher data rate over the bus 108 when the bus clock signal 124 runs at a higher frequency. Thus, in the example of FIG. 2, the bus controller 102 can read the portion D1 at a higher data rate in time interval TA than when reading the second portion D2 in time interval TB. In the example of FIG. 2, time interval TA is shorter than each of time intervals TB and TD, which signifies that the amount of time to read the portion D1 is shorter than the amount of time to read either the portion D2 or the portion D4 (assuming that the portions D1, D2, and D4 are of the same size).

In some examples, the attack mitigation module 120 can dynamically vary the clock parameter values and correspondingly the bus clock frequency in a random manner. For example, the attack mitigation module 120 can include a random number generator that generates random numbers. The attack mitigation module 120 can derive different clock parameter values based on different random numbers. In other examples, the attack mitigation module 120 can dynamically vary the clock parameter values in another unpredictable manner to mitigate an attack on the electronic device 100.

As noted above, some buses (such as an SPI bus) communicate different information (e.g., a command, an address, and data) in respective different phases (a command phase, an address phase, and a data phase). More generally, different frequencies can be specified for different phases (e.g., a first frequency specified for the command phase, a second frequency specified for the address phase, and a third frequency specified for the data phase, where the first, second, and third frequencies can be the same as or different from one another.

Figure 3:
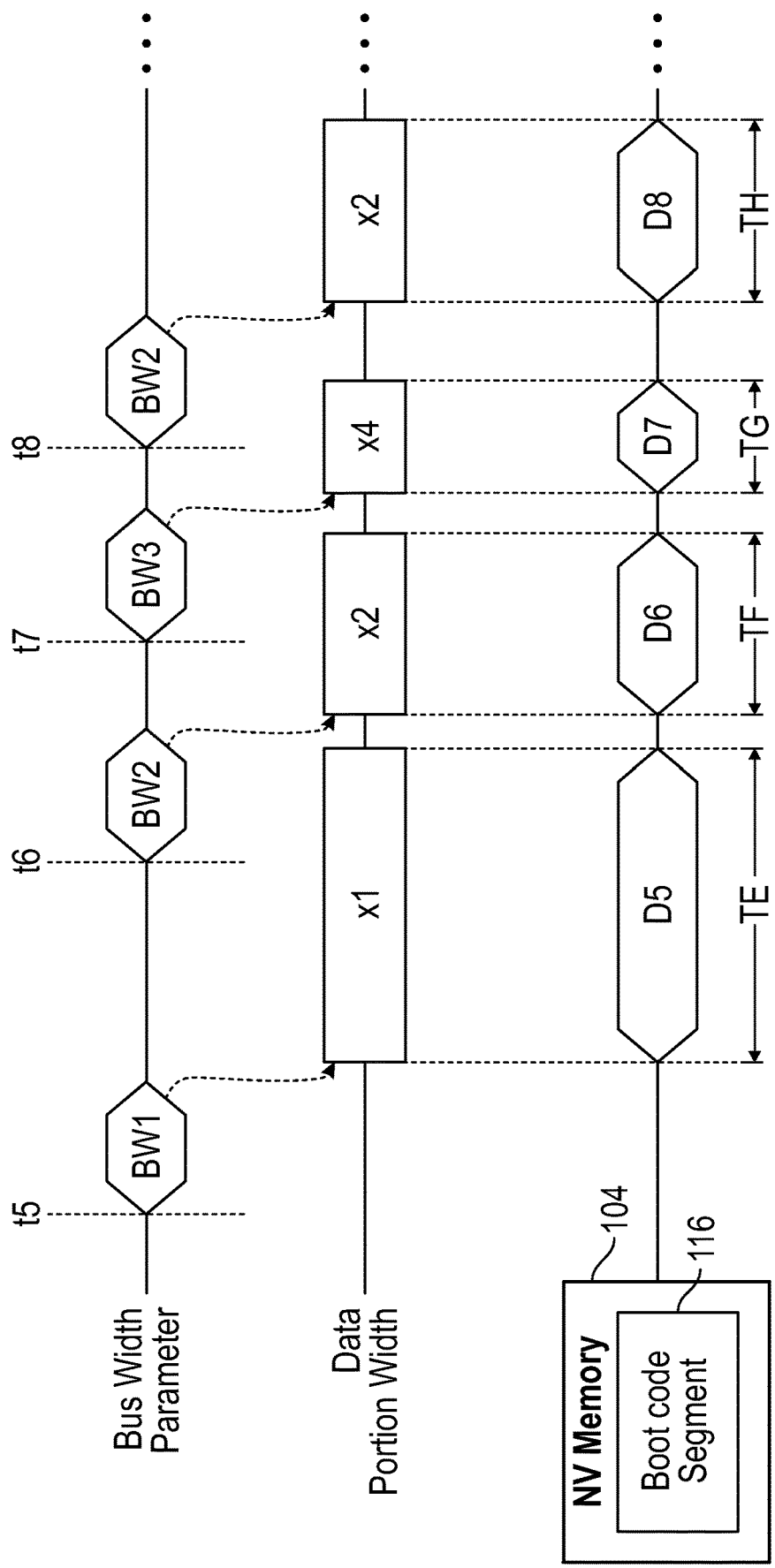
FIG. 3 is a timing diagram of a process of dynamically varying bus data portion widths according to some examples.

FIG. 3 shows an example timing diagram that illustrates how the bus width of the bus 108 can be dynamically varied at different times to read respective different portions (represented as portions D5, D6, D7, and D8 in FIG. 3) of the boot code segment 116 from the nonvolatile memory device 104, such as during a boot process of an electronic device.

As part of reading the boot code segment 116 from the nonvolatile memory device 104, the attack mitigation module 120 can write successively different bus width parameter values to the configuration register 128. For example, at time t5, the attack mitigation module 120 can write a bus width parameter value BW1 to the configuration register 128; at time t6, the attack mitigation module 120 can write a bus width parameter value BW2 (different from BW1) to the configuration register 128; at time t7, the attack mitigation module 120 can write the bus width parameter value BW3 (different from each of BW1 and BW2)to the configuration register 128; and at time t8, the attack mitigation module 120 can write the bus width parameter value BW2 to the configuration register 128.

The different values of the bus width parameter (BW1, BW2, and BW3) can correspond to different bus widths of the bus 108. For example, if the bus 108 is an SPI bus, then the different bus width parameter values BW1, BW2, and BW3 correspond to the following respective different SPI modes: x1, x2, and x4.

As shown in FIG. 2, writing the value BW1 of the bus width parameter at time t5 to the configuration register 128 causes the bus controller 102 to set the x1 mode of the bus 108 (e.g., the data portion 126 of the bus 108 has a width of 1) during a time interval TE; writing the value BW2 of the bus width parameter at time t6 to the configuration register 128 causes the bus controller 102 to set the x2 mode of the bus 108 (e.g., the data portion 126 of the bus 108 has a width of 2) during a time interval TF; writing the value BW3 of the bus width parameter at time t7 to the configuration register 128 causes the bus controller 102 to set the x4 mode of the bus 108 (e.g., the data portion 126 of the bus 108 has a width of 1) during a time interval TG, and writing the value BW2 of the bus width parameter at time t8 to the configuration register 128 causes the bus controller 102 to set the x2 mode of the bus 108 during a time interval TH.

During the time interval TE that the bus 108 is set at the x1 mode, the bus controller 102 reads the portion D5 of the boot code segment 116 from the nonvolatile memory device 104; during the time interval TF that the bus 108 is set at the x2 mode, the bus controller 102 reads the portion D6 of the boot code segment 116 from the nonvolatile memory device 104; during the time interval TG that the bus 108 is set at the x4 mode, the bus controller 102 reads the portion D7 of the boot code segment 116 from the nonvolatile memory device 104; and during the time interval TH that the bus 108 is set at the x2 mode, the bus controller 102 reads the portion D8 of the boot code segment 116 from the nonvolatile memory device 104.

In the example of FIG. 3, assuming the portions D5 and D6 are of equal size, the portion D5 is read from the nonvolatile memory device 104 using the x1 mode in a longer amount of time than reading the portion D6 from the nonvolatile memory device 104 using the x2 mode. Similarly, assuming the portions D6 and D7 are of equal size, the portion D6 is read from the nonvolatile memory device 104 using the x2 mode in a longer amount of time than reading the portion D7 from the nonvolatile memory device 104 using the x4 mode. More generally, data can be read from the nonvolatile memory device 104 in a shorter amount of time if a greater bus width is used.

In the example of FIG. 3, time interval TE is larger than each of time intervals TF and TG, and the time interval TF is larger than the time interval TG.

In some examples, the attack mitigation module 120 can dynamically vary the bus width parameter values and correspondingly the bus clock frequency in a random or another unpredictable manner.

In some examples, different information can be communicated over the bus 108 (e.g., an SPI bus) in multiple phases of a transaction. A "transaction" refers to a collection of actions on the bus 108 that together perform a target task, such as reading or writing the nonvolatile memory. For example, the multiple phases of a transaction can include a command phase, an address phase, and a data phase. A command is communicated over the data portion 126 of the bus 108 in the command phase, an address is communicated over the data portion 126 of the bus 108 in the address phase, and data is communicated over the data portion 126 of the bus 108 in the data phase. The command communicated in the command phase can be a read command (to read data from the nonvolatile memory device 104) or a write command (to write data from the nonvolatile memory device 104), as examples. The address communicated in the address phase can be an address of a storage location in the nonvolatile memory device 104 from which or to which data is to be read or written. The data communicated in the data phase can be read data (data read from the nonvolatile memory device 104) or write data (data written to the nonvolatile memory device 104).

The widths of the data portion 126 of the bus 108 to communicate different information in the multiple phases of a transaction can be the same or can be different. More specifically, the data portion 126 to communicate a command in the command phase can have a first width, the data portion 126 to communicate an address in the address phase can have a second width, and the data portion 126 to communicate data in the data phase can have a third width. The first width, second width, and third width can be the same or can be different from one another.

The bus controller 102 can independently control the width of the data portion 126 used in each phase of a transaction. The widths of the data portion 126 used in the respective multiple phases can be set according to multi-phase bus width configuration. For example, a 1-1-1 multi-phase bus width configuration specifies that the width of the data portion 126 in each of the command phase, the address phase, and the data phase is 1. As another example, a 4-4-4 multi-phase bus width configuration specifies that the width of the data portion 126 in the command phase, the address phase, and the data phase is 4. As a further example, a 1-2-2 multi-phase bus width configuration specifies that the width of the data portion 126 in the command phase is 1, the width of the data portion 126 in the address phase is 2, and the width of the data portion 126 in the data phase is 2. As yet another example, a 4-1-2 multi-phase bus width configuration specifies that the width of the data portion 126 in the command phase is 4, the width of the data portion 126 in the address phase is 1, and the width of the data portion 126 in the data phase is 2. More generally, an x-y-z multi-phase bus width configuration specifies that the width of the data portion 126 in the command phase is x, the width of the data portion 126 in the address phase is y, and the width of the data portion 126 in the data phase is z, where $x \in (1, 2, 4)$, $y \in (1, 2, 4)$, and $z \in (1, 2, 4)$ in examples where the data portion 126 is configurable to a width of 1, 2, or 4. In other examples, other values of x, y, and z can be employed.

In such examples, different bus width parameters can specify different multi-phase bus width configurations, such that successive portions of the boot code segment 116 can use different multi-phase bus width configurations. For example, a first bus width parameter can specify a first combination of widths (x, y, z) of the data portion of the bus used to transfer a command, an address, and data of a first transaction over the bus, and a different second value of the bus width parameter specifies a second combination of widths (x, y, z) of the data portion of the bus used to transfer a command, an address, and data of a second transaction over the bus. As an example, the first transaction is used to transfer a first portion of the boot code segment 116, and the second transaction is used to transfer a first portion of the boot code segment 116.

By modifying bus attribute parameters according to some examples of the present disclosure, a behavior of an electronic device can be dynamically varied, which can result in variations of timings of operations in the electronic device, power consumption in the electronic device, and electromagnetic radiation levels from the electronic device. Techniques or mechanisms according to some implementations of the present disclosure can thwart attempts to easily repeat electronic device operations (e.g., boot sequences) in attempts to increase the probability of inducing a malfunction. Thus, attacks of an electronic device that are based on repeatability of electronic device operations determined from observing a behavior of an electronic device during a particular operation (e.g., a boot sequence) of the electronic device can be mitigated.

The dynamic variation of operational characteristics of the bus according to some implementations of the present disclosure is not used for improving performance, but to improve security of the electronic device 100. In fact, the dynamic variation of the operational characteristics of the bus can cause performance to suffer during a boot process, such as when a portion of a boot code is retrieved from the nonvolatile memory 104 using a slower bus clock and/or using a narrower data portion width of the bus 108. The dynamic variation of operational characteristics of the bus produces unpredictability in the power consumption, electromagnetic emissions, latency, and fetch cadence for cryptographic operations that involve data retrieval over the bus 108. For example, dynamically changing the bus behavior on the fly makes it more difficult to get meaningful insight into cryptographic operations of the BMC 112 based on measuring the power and/or electromagnetic emissions and time the electronic device 100 takes to execute the boot process. Moreover, random changes to the address and data portion widths create additional barriers against any entity-in the-middle attacks on the bus 108.

Figure 4:
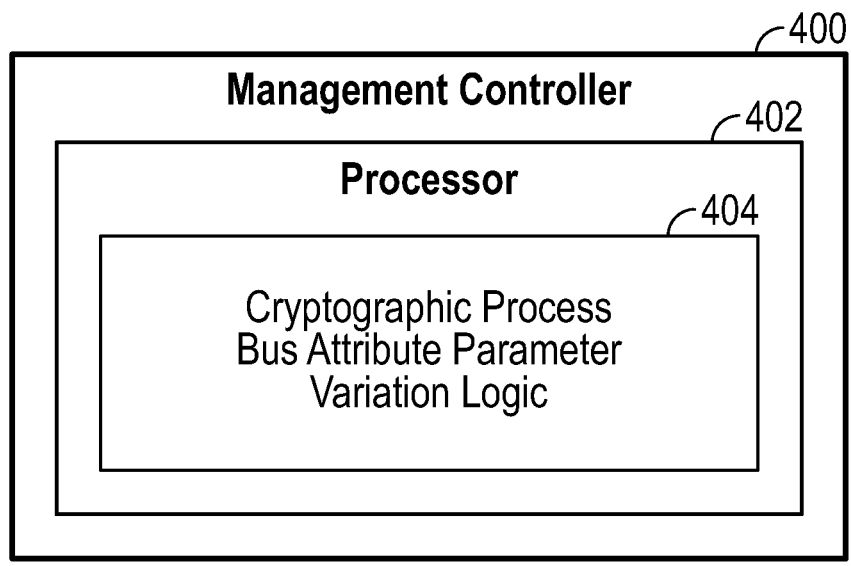
FIG. 4 is a block diagram of a management controller according to some examples.

FIG. 4 is a block diagram of a management controller 400 according to some examples of the present disclosure. The management controller 400 can be the BMC 112 of FIG. 1, for example:

The management controller 400 includes a processor 402 that includes cryptographic process bus attribute parameter variation logic 404. The processor 402 includes processing circuitry in the management controller 400, and the processor 402 of the management controller 400 is separate from the main processor(s) (e.g., 110 in FIG. 1) of an electronic device. The processor 402 can be part of the root of trust engine 114, for example. In more specific examples, the processor 402 can be implemented with a hardware state machine that does not rely on machine-readable instructions to execute. In other examples, the processor 402 can execute machine-readable instructions. Note that the processor 402 that is part of the management controller 400 (e.g., the BMC 112) is separate from the main processor 110 of the electronic device 100 of FIG. 1.

The cryptographic process bus attribute parameter variation logic 404 can be implemented using hardware or machine-readable instructions. The cryptographic process bus attribute parameter variation logic 404 can be an example of the attack mitigation module 120 of FIG. 1.

The cryptographic process bus attribute parameter variation logic 404 dynamically varies a bus attribute parameter that controls an operational characteristic of a bus (e.g., 108 in FIG. 1) when transferring different portions of information from a memory (e.g., 104 in FIG. 1) over the bus during a process of an electronic device in which a cryptographic operation is performed. The process can be a boot process of the electronic device, for example.

The different portions of the information from the memory are transferred over the bus with different operational characteristics of the bus. Examples of the different operational characteristics include one or more of different bus clock frequencies and widths of a data portion of the bus.

In some examples, the different portions of the information comprise different portions of a program code stored in the memory. The program code can include a boot code, for example, such as the boot code segment 116 of FIG. 1.

In some examples, the management controller 400 includes a bus controller (e.g., 102 in FIG. 1). The cryptographic process bus attribute parameter variation logic 404 dynamically varies the bus attribute parameter by sending first control information to the bus controller. The first control information specifies a first value of the bus attribute parameter of the bus connected to the memory. The first value of the bus attribute parameter controls a transfer of a first portion of the information from the memory over the bus. The cryptographic process bus attribute parameter variation logic 404 further sends second control information to the bus controller. The second control information specifies a second value (different from the first value) of the bus attribute parameter of the bus connected to the memory. The second value of the bus attribute parameter controls a transfer of a second portion of information from the memory over the bus.

In some examples, the first control information and the second control information are to program a configuration register (e.g., 128 of FIG. 1) of the bus controller, where the configuration register relates to a control of the bus attribute parameter. For example, the first and second control information can include first and second configuration write commands to write to the configuration register.

In some examples, the bus attribute parameter to be dynamically varied by the cryptographic process bus attribute parameter variation logic 404 relates to a clock frequency of a clock signal (e.g., 124 in FIG. 1) of the bus, where different values of the bus attribute parameter indicate different clock frequencies of the clock signal. In further examples, the bus attribute parameter to be dynamically varied by the cryptographic process bus attribute parameter variation logic 404 relates to a width of a data portion of the bus, where different values of the parameter indicate different bus widths and/or behaviors of the data portion of the bus. In some cases (such as with an SPI bus), different commands can specify respective data widths to use for an address and data; in such examples, different values of a bus width parameter can control which command is issued.

In some examples, the management controller 400 includes a bus controller (e.g., 102 in FIG. 1). In some examples, the bus controller dynamically varies a command issued over the bus to be consistent with the width of the data portion of the bus specified by the parameter. In further examples, the cryptographic process bus attribute parameter variation logic 404 dynamically varies a command parameter of a configuration register of the bus controller to dynamically vary a command issued by the bus controller over the bus to be consistent with the width of the data portion of the bus specified by the parameter.

In some examples, the data portion of the bus is to transfer one or more of a command, an address, and data with the memory. For example, the data portion of the bus is to transfer the command, the address, and the data with the memory in respective phases of a transaction over the bus. The bus attribute parameter to be dynamically varied by the controller relates to widths of the data portion of the bus used to transfer the command, the address, and the data. The bus attribute parameter can specify a multi-phase bus width configuration as discussed above.

Figure 5:
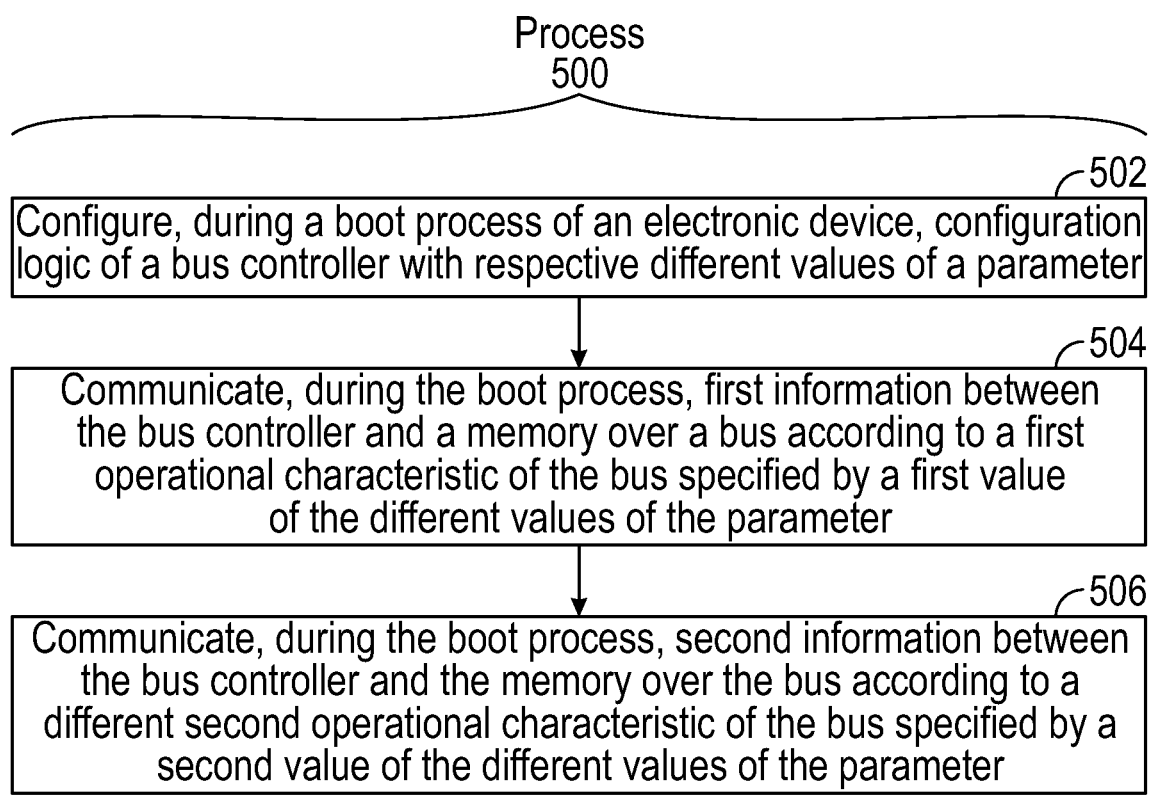
FIG. 5 is a flow diagram of a process according to some examples.

FIG. 5 is a flow diagram of a process 500 of a management controller, such as the BMC 112 of FIG. 1. The process 500 includes configuring (at 502), during a boot process of an electronic device, configuration logic of a bus controller with respective different values of a parameter. For example, the management controller can write dynamically varied bus attribute parameter values to a configuration register (or multiple configuration registers) of a bus controller, to cause dynamically varying operational characteristics of a bus.

The process 500 includes communicating (at 504), during the boot process, first information between the bus controller and a memory over a bus according to a first operational characteristic of the bus specified by a first value of the different values of the parameter. For example, the first operational characteristic can be a first clock frequency and/or a first width of a data portion of the bus.

The process 500 includes communicating (at 506), during the boot process, second information between the bus controller and the memory over the bus according to a different second operational characteristic of the bus specified by a second value of the different values of the parameter. For example, the second operational characteristic can be a second clock frequency and/or a second width of the data portion of the bus. In some examples, varying operational characteristics of the bus based on programming the configuration logic with the respective different values of the parameter protects against a side-channel attack or an entity-in-the-middle attack.

Figure 6:
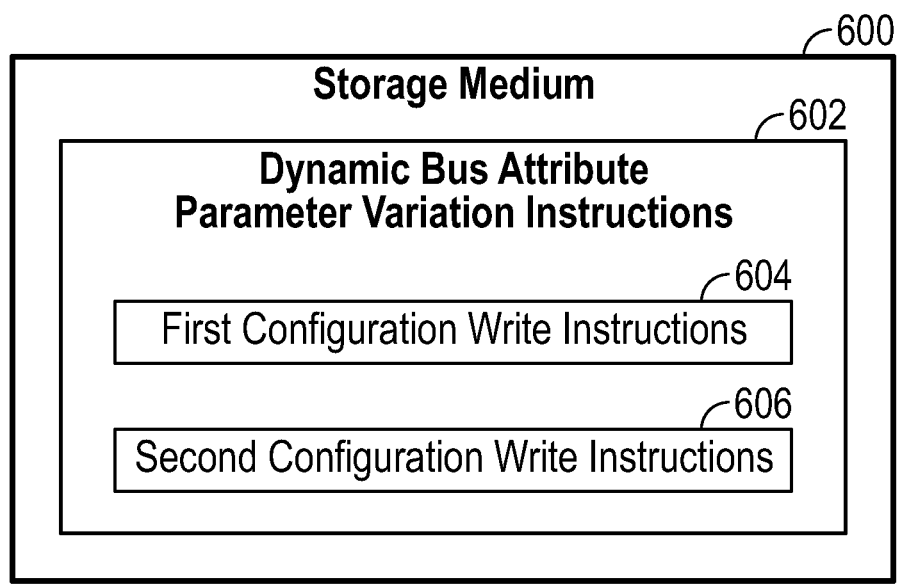
FIG. 6 is a block diagram of a storage medium storing machine-readable instructions according to some examples.

FIG. 6 is a block diagram of a non-transitory machine-readable or computer-readable storage medium 600 storing machine-readable instructions that upon execution cause a controller to perform various tasks. The controller can be the BMC 112 of FIG. 1 for example, or another type of controller.

The machine-readable instructions include dynamic bus attribute parameter variation instructions 602 to, during a process in which a cryptographic operation is performed, dynamically vary a bus attribute parameter to vary operational characteristics of a bus (e.g., 108 in FIG. 1) that connects a bus controller (e.g., 108 in FIG. 1) and a memory (e.g., 104 in FIG. 1). The process can be a boot process, for example.

The dynamic bus attribute parameter variation instructions 602 include first configuration write instructions 604 to write, to a configuration register (e.g., 128 in FIG. 1) of the bus controller, a first value of the bus attribute parameter to cause a first operational characteristic of the bus when transferring a first boot code portion from the memory. The bus controller uses the first value of the bus attribute parameter to control the first operational characteristic of the bus.

The dynamic bus attribute parameter variation instructions 602 include second configuration write instructions 606 to write, to the configuration register of the bus controller, a second value of the bus attribute parameter to cause a different second operational characteristic of the bus when transferring second information with the memory. The bus controller uses the second value of the bus attribute parameter to control the second operational characteristic of the bus.

Each of the first operational characteristic and the second operational characteristic relates to one or more of a frequency of a clock signal of the bus and a width of a data portion of the bus.

The storage medium 600 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

A "BMC" can refer to a specialized service controller that monitors the physical state of an electronic system using sensors and communicates with a remote management system (that is remote from the electronic system) through an independent "out-of-band" connection. The BMC can perform management tasks to manage components of the electronic system. Examples of management tasks that can be performed by the BMC can include any or some combination of the following: power control to perform power management of the electronic system (such as to transition the electronic system between different power consumption states in response to detected events), thermal monitoring and control of the electronic system (such as to monitor temperatures of the electronic system and to control thermal management states of the electronic system), fan control of fans in the electronic system, system health monitoring based on monitoring measurement data from various sensors of the electronic system, remote access of the electronic system (to access the electronic system over a network, for example), remote reboot of the electronic system (to trigger the electronic system to reboot using a remote command), system setup and deployment of the electronic system, system security to implement security procedures in the electronic system, and so forth.

In some examples, the BMC can provide so-called "lights-out" functionality for an electronic system. The lights out functionality may allow a user, such as a systems administrator, to perform management operations on the electronic system even if an operating system (OS) is not installed or not functional on the electronic system.

Moreover, in some examples, the BMC can run on auxiliary power provided by an auxiliary power supply (e.g., a battery); as a result, the electronic system does not have to be powered on to allow the BMC to perform the BMC's operations. The auxiliary power supply is separate from a main power supply that supplies powers to other components (e.g., a main processor, a memory, an input/output (I/O) device, etc.) of the electronic system.

In some examples, in addition to the BMC in each electronic system, an additional management controller (separate from the BMCs) can be used to interact with the BMCs to perform management of the electronic systems. In examples where the electronic systems are server computers (or other types of electronic systems) mounted in a rack, the additional management controller can be referred to as a rack management controller (RMC). A "rack" refers to a mounting structure that has supports for multiple electronic systems.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A management controller comprising:
   a processor to:
   dynamically vary a parameter that controls an operational characteristic of a bus when transferring different portions of information from a memory over the bus during a process of an electronic device in which a cryptographic operation is performed, wherein the different portions of the information from the memory are to be transferred over the bus with different operational characteristics of the bus, wherein the different portions of the information comprise different portions of a boot code stored in the memory.

2. A management controller comprising:
   a bus controller;
   a processor to:
   dynamically vary a parameter that controls an operational characteristic of a bus controlled by the bus controller when transferring different portions of information from a memory over the bus during a process of an electronic device in which a cryptographic operation is performed, wherein the different portions of the information from the memory are to be transferred over the bus with different operational characteristics of the bus;
   sending first control information to the bus controller, the first control information specifying a first value of the parameter of the bus connected to the memory, the first value of the parameter to control a transfer of a first portion of the information from the memory over the bus; and
   sending second control information to the bus controller, the second control information specifying a second value of the parameter of the bus connected to the memory, the second value of the parameter to control a transfer of a second portion of information from the memory over the bus, the second value different from the first value.

3. The management controller of claim 2, wherein the first control information and the second control information are to program a configuration register of the bus controller, the configuration register relating to a control of the parameter.

4. The management controller of claim 1, wherein the processor is implemented using a hardware state machine.

5. The management controller of claim 1, wherein the parameter to be dynamically varied relates to a clock frequency of a clock signal of the bus, and wherein different values of the parameter indicate different clock frequencies of the clock signal.

6. A management controller comprising:
   a processor to:
   dynamically vary a parameter that controls an operational characteristic of a bus when transferring different portions of information from a memory over the bus during a process of an electronic device in which a cryptographic operation is performed, wherein the different portions of the information from the memory are to be transferred over the bus with different operational characteristics of the bus,
   wherein the parameter to be dynamically varied relates to a width of a data portion of the bus, and wherein different values of the parameter indicate different bus widths of the data portion of the bus.

7. The management controller of claim 6, further comprising a bus controller to dynamically vary a command issued over the bus to be consistent with the width of the data portion of the bus specified by the parameter.

8. The management controller of claim 6, further comprising a bus controller for the bus, the bus controller comprising a configuration register,
   wherein the processor is to dynamically vary a command parameter of the configuration register to dynamically vary a command issued by the bus controller over the bus to be consistent with the width of the data portion of the bus specified by the parameter.

9. The management controller of claim 6, wherein the data portion of the bus comprises a collection of data signal lines, and wherein different values of the parameter indicate use of respective different quantities or behaviors of data signal lines of the collection of data signal lines.

10. The management controller of claim 6, wherein the data portion of the bus is to transfer one or more of a command, an address, and data with the memory.

11. The management controller of claim 10, wherein the data portion of the bus is to transfer the command, the address, and the data with the memory in respective phases of a transaction over the bus.

12. The management controller of claim 10, wherein the parameter to be dynamically varied relates to widths of the data portion of the bus used to transfer the command, the address, and the data.

13. The management controller of claim 12, wherein a first value of the parameter indicates a first combination of widths of the data portion of the bus used to transfer a command, an address, and data of a first transaction over the bus, and
   wherein a different second value of the parameter indicates a second combination of widths of the data portion of the bus used to transfer a command, an address, and data of a second transaction over the bus, wherein the data of the first transaction comprises a first portion of the information, and the data of the second transaction comprises a second portion of the information.

14. The management controller of claim 1, wherein the process of the electronic device during which the parameter is dynamically varied is a boot process of the electronic device.

15. A method of a management controller, comprising:
configuring, during a boot process of an electronic device, configuration logic of a bus controller with respective different values of a parameter;
communicating, during the boot process, first information between the bus controller and a memory over a bus according to a first operational characteristic of the bus specified by a first value of the different values of the parameter; and
communicating, during the boot process, second information between the bus controller and the memory over the bus according to a different second operational characteristic of the bus specified by a second value of the different values of the parameter.

16. The method of claim 15, wherein the first and second operational characteristics of the bus comprise different clock frequencies of a clock signal of the bus.

17. The method of claim 15, wherein the first and second operational characteristics of the bus comprise different widths of a data portion of the bus.

18. A non-transitory machine-readable storage medium comprising instructions that upon execution cause a controller to:
during a process in which a cryptographic operation is performed, dynamically vary a bus attribute parameter to vary operational characteristics of a bus that connects a bus controller and a memory, wherein the dynamic varying of the bus attribute parameter comprises:
writing, to a configuration register of the bus controller, a first value of the bus attribute parameter to cause a first operational characteristic of the bus when transferring a first boot code portion from the memory, and
writing, to the configuration register of the bus controller, a second value of the bus attribute parameter to cause a different second operational characteristic of the bus when transferring a second boot code portion from the memory,
wherein each of the first operational characteristic and the second operational characteristic relates to one or more of a frequency of a clock signal of the bus and a width of a data portion of the bus.

19. The non-transitory machine-readable storage medium of claim 18, wherein each of the first operational characteristic and the second operational characteristic relates to widths of the data portion of the bus used during multiple phases of a transaction on the bus.

* * * * *